United States Patent
Reamey

(10) Patent No.: US 8,201,143 B2
(45) Date of Patent: Jun. 12, 2012

(54) DYNAMIC MATING OF A MODIFIED USER INTERFACE WITH PRE-MODIFIED USER INTERFACE CODE LIBRARY

(75) Inventor: Donald Allen Reamey, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 1370 days.

(21) Appl. No.: 11/540,085

(22) Filed: Sep. 29, 2006

(65) Prior Publication Data
US 2008/0127060 A1 May 29, 2008

(51) Int. Cl.
*G06F 9/44* (2006.01)
(52) U.S. Cl. ...................................................... 717/117
(58) Field of Classification Search .................. 717/100, 717/104, 120, 162, 111, 117; 707/1, 5; 715/780, 715/513, 763; 705/28; 709/330; 719/311
See application file for complete search history.

(56) References Cited

U.S. PATENT DOCUMENTS

| | | | |
|---|---|---|---|
| 6,205,579 B1 | 3/2001 | Southgate | |
| 6,337,696 B1* | 1/2002 | Lindhorst et al. | 715/763 |
| 6,874,680 B1 | 4/2005 | Klaus et al. | |
| 6,880,086 B2 | 4/2005 | Kidder et al. | |
| 6,948,164 B2 | 9/2005 | Tinker | |
| 7,464,381 B1* | 12/2008 | Nickerson et al. | 719/311 |
| 7,603,351 B2* | 10/2009 | Mansfield et al. | 1/1 |
| 2003/0145305 A1* | 7/2003 | Ruggier | 717/100 |
| 2003/0182627 A1* | 9/2003 | Chung et al. | 715/513 |
| 2003/0217195 A1* | 11/2003 | Mandal et al. | 709/330 |
| 2003/0229890 A1 | 12/2003 | Lau et al. | |
| 2004/0015418 A1* | 1/2004 | Dooley et al. | 705/28 |
| 2004/0034620 A1* | 2/2004 | Kataoka | 707/1 |
| 2005/0028142 A1* | 2/2005 | Ten Kate et al. | 717/120 |
| 2005/0155027 A1* | 7/2005 | Wei | 717/162 |
| 2005/0193386 A1 | 9/2005 | McCaleb et al. | |
| 2005/0203975 A1 | 9/2005 | Jindal et al. | |
| 2005/0229109 A1* | 10/2005 | Haley | 715/780 |
| 2006/0080654 A1 | 4/2006 | Shelton | |
| 2007/0226681 A1* | 9/2007 | Thorup | 717/104 |

OTHER PUBLICATIONS

"Deploying objectivity/db in element management systems", Aug. 2006, pp. 1-33, http://www.objectivity.com/WhitePapers/EMSWhitePaper.shtml.

"234)Is There an Ada binding for Motif? (Part 1 of 2)", Date: Jan. 1996, pp. 1-7, http://www.faqs.org/faqs/motif-faq/part7/section-7.html.

"RapiDeploy Intelligent Architecture™", Date: Jul. 2005, pp. 1-10, http://www.finepoint.com/pdfs/rapideploy-architecture.pdf.

Kurakin et al., "FLEXUSI—Interface building for computer based Accelerator monitoring and control system", Date: 2004, pp. 347-349, http://epaper.,kek.jp/r04/papers/WEHP06.PDF.

* cited by examiner

*Primary Examiner* — Tuan Anh Vu
(74) *Attorney, Agent, or Firm* — Merchant & Gould

(57) ABSTRACT

Mating of a modified user interface to existing user interface code is provided. When a user interface is modified, a pseudo code representation of the modified user interface is generated. At application runtime, the pseudo code representation is passed to a user interface render engine that is modified to parse the pseudo code representation to generate a representation of the modified user interface that may be processed by the render engine for rendering the modified user interface for display. A generic code library is generated for receiving events from the modified user interface and for passing the received events to proper event handlers in the existing code library without the need to modify the existing code library in response to modifying the user interface.

14 Claims, 3 Drawing Sheets

DYNAMIC MATING OF A MODIFIED USER INTERFACE WITH PRE-MODIFIED USER INTERFACE CODE LIBRARY

BACKGROUND

In a software development environment, components of a user interface are mated to corresponding software code in an underlying code library. When an event is received via the user interface, for example, the clicking of a button, an event handler in the underlying code processes the event and causes the underlying code to provide the functionality associated with the received event. If a migration in the user interface occurs or when the user interface is modified, for example, adding a new button and corresponding event, the underlying code that supports the user interface must be modified to support the changes. Such reconfiguration and/or re-compilation of underlying application code each time a user interface is modified cause user interface development to be tedious and time consuming. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing dynamic mating of modified user interface components with pre-modified or existing user interface code. A pseudo code representation is created which defines the user interface before and after it is modified. The pseudo code representation contains information about the existing (currently running) user interface and about changes to the existing user interface associated with the modified user interface. The pseudo code representation also includes information about events that are associated with the modified user interface. For example, the pseudo code representation includes events associated with new or modified buttons or controls contained in the modified user interface. In addition, the pseudo code representation includes information about the underlying code library responsible for receiving events via the pre-modified and modified user interface and for processing those events.

At application runtime, the pseudo code representation is read from a data file and is passed to a user interface render engine. The render engine is operative to parse the pseudo code representation to generate a representation of the modified user interface that may be processed by the render engine for rendering the modified user interface for display. When the pseudo code representation is parsed, a table is created for mapping events associated with the user interface to associated event handlers in the underlying code library.

A generic code dynamic link library is compiled for the current computing platform and is used for receiving events from the user interface and for passing the received events to proper event handlers in the original code dynamic link library or executable code associated with the user interface. Thus, when an event is received via the new or existing user interface, the generic code receives the event and forwards the event to an associated event handler in the existing code to ensure that the appropriate functionality of the associated software application is executed in response to the event received via the new or modified user interface.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
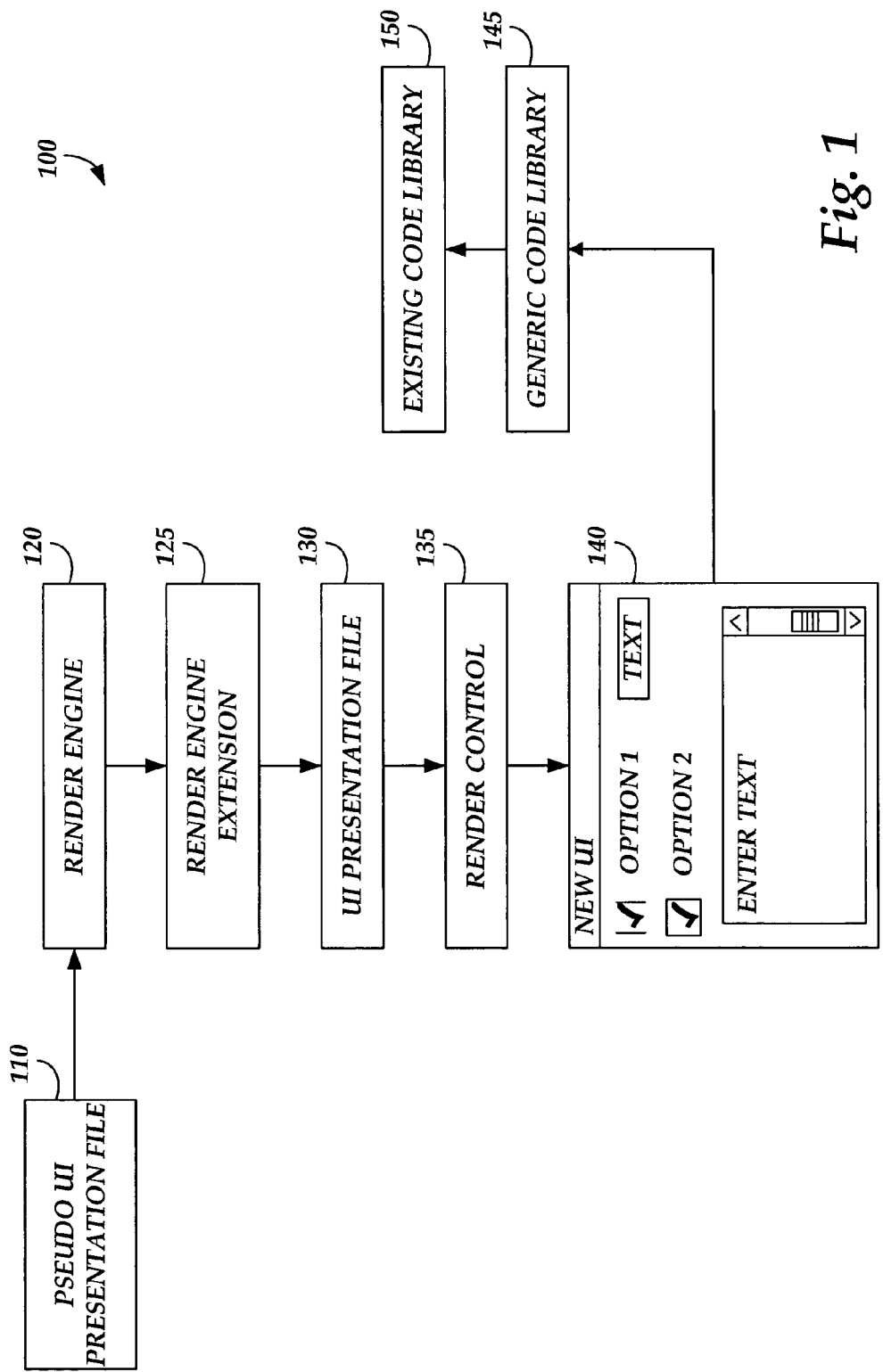
FIG. 1 is a simplified block diagram illustrating a system for dynamically mating modified user interface components with pre-modified user interface code library.

As briefly described above, embodiments of the present invention are directed to dynamic mating of modified user interface components with pre-existing user interface code libraries such that the pre-existing code libraries need not be reconfigured and/or recompiled for each modification made to an associated user interface. In the following detailed description, references are made to the accompanying drawings that form a part hereof, and in which are shown, by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents. Referring now to the drawings, in which like numerals refer to like elements through the several figures, aspects of the present invention and an exemplary computing operating environment will be described.

FIG. 1 is a simplified block diagram illustrating a system for dynamically mating user interface components and associated events of a user interface with software application code library associated with a pre-modified code library. As described above, when a software developer desires to modify an existing user interface to add new components to the user interface, to modify components contained in the user interface, or to change the look and feel of the user interface, a pseudo code representation of the modified user interface is generated. The pseudo code representation describes the user interface before and after it is modified by a developer. When the application starts up with the new or modified pseudo code-based user interface (UI), the UI is rendered with any changes. Referring to FIG. 1, the pseudo user interface presentation data 110 is representative of a modified user interface that will be rendered according to the software developer's design. The pseudo user interface presentation file or data includes information about the pre-modified user interface components and associated events, and the data 110 also includes information about modifications to the user interface and events associated with modified user interface components. In addition, the pseudo user interface presentation data includes information about the existing code library 150 for the software application for which the user interface is developed. For example, if the user interface being modified in accordance with embodiments of the present invention is associated with a word processing application, the pseudo user interface presentation data will include information about the existing code library of the associated word processing application required for receiving and processing events received via the user interface.

According to embodiments, the pseudo user interface presentation data is in the form of a pseudo Extensible Application Markup Language file (hereafter pXAML). According to an embodiment, the pXAML file 110 is stored as a metadata file. The metadata file is an Extensible Markup Language (XML) file that is used to describe how the associated UI looks at application runtime. The metadata is loaded at application startup and is cached in memory. When it is time to render the new or modified user interface associated with the pXAML file 110, the pXAML file 110 is loaded by the render engine 120 and is parsed. Once the file is parsed, UI elements/controls are created and displayed. As is understood by those skilled in the art, the Extensible Application Markup Language (XAML) is a user interface markup language associated with the Windows Presentation Foundation® (WPF) which is associated with the NET framework provided by MICROSOFT CORPORATION of Redmond, Wash. XAML is one example language that may be used in user interface development. Embodiments of the present invention are equally applicable to other computing languages that may be used for developing and rendering user interfaces and for associating rendered user interfaces with underlying software code assemblies.

Referring still to FIG. 1, a render engine 120 is a software module operative to render the modified user interface from the information contained in the pseudo user interface presentation file 110. A render engine extension 125 is provided for modifying the render engine 120 to allow the render engine 120 to parse the pseudo user interface presentation file 110 (e.g., pXAML file) to create a user interface presentation file in a language or format that may be rendered into a displayable user interface. According to one embodiment, the render engine extension 125 is operative to parse the pXAML file and to create an associated UI artifact. This UI artifact is of a type that is understood by the render engine 120 to render a displayable user interface 140 containing the modifications prescribed for the new user interface in the pXAML file. According to one embodiment, the UI artifact is in the form of a XAML file. However, as should be understood by those skilled in the art, other forms of the render engine extensions 125 may be utilized for generating other types of machine-readable files from the pseudo user interface presentation data. For example, one type of extension may be utilized for generating a Hypertext Markup Language (HTML) control from a pseudo HTML file. Another form of the extension may be utilized for creating a WinForm control from an associated pseudo WinForm file, and the like.

The parsing process conducted by the render engine extension 125 creates a user interface presentation file or data 130 that may be used to render a displayable user interface. According to embodiments, the user interface presentation file 130 is in the form of a XAML file. The XAML file 130 conforms to XAML schemas associated with user interface generation and display. According to one embodiment, the XAML file conforms to Windows Presentation Foundation® (WPF) XAML schemas. The render engine extension 125 also creates a table of events that are defined in the pseudo user interface presentation data (e.g., the pXAML file 110). This table is used later by a generic code library 145 for dynamically wiring events associated with the modified or new user interface 140 with existing code assemblies associated with the underlying software application.

The render control block 135 and the new user interface 140 are representative of the processing and output performed by the render engine 120 in rendering the new user interface 140 containing the modifications and other changes prescribed by the pseudo user interface presentation data 110 (e.g., pXAML file 110). As described above, the new user interface 140 is rendered from the UI presentation file 130 (e.g., XAML file) by the render engine 120.

Referring still to FIG. 1, the generic code library 145 is a software module operative to associate the components and events of the new user interface 140 with an existing code library 150 associated with the software application for which the new user interface 140 is rendered and displayed. As described above, the render engine 120 in association with the render engine extension 125 generates a table that maps events associated with the new user interface with event handlers in the existing code library 150. When events are received via the new user interface 140, the generic code library 145 is responsible for receiving those events and for forwarding those events to the appropriate event handlers in the existing code library 150. For example, if an event associated with the modified or new user interface 140 is identified as "click on format button," but the event handler in the existing code library expects an event identified as "format button click," then when the new or modified event is received by the generic code library 145, the new event is mapped to the associated event handler in the existing code library. The generic code library 145 then forwards the received event to the appropriate event handler in the existing code library, and the associated functionality of the software application is executed. Thus, by mapping modifications in the new user interface 140 and their associated events to existing event handlers in the existing or pre-modified code library 150 via the generic code library 145, a software developer may generate a new user interface 140 with new or modified user interface components, and the UI may have different event handlers (as mentioned previously) and may map the modifications to the existing application code library without being required to manually modify the existing code library for each modification made in the new user interface 140.

Figure 2:
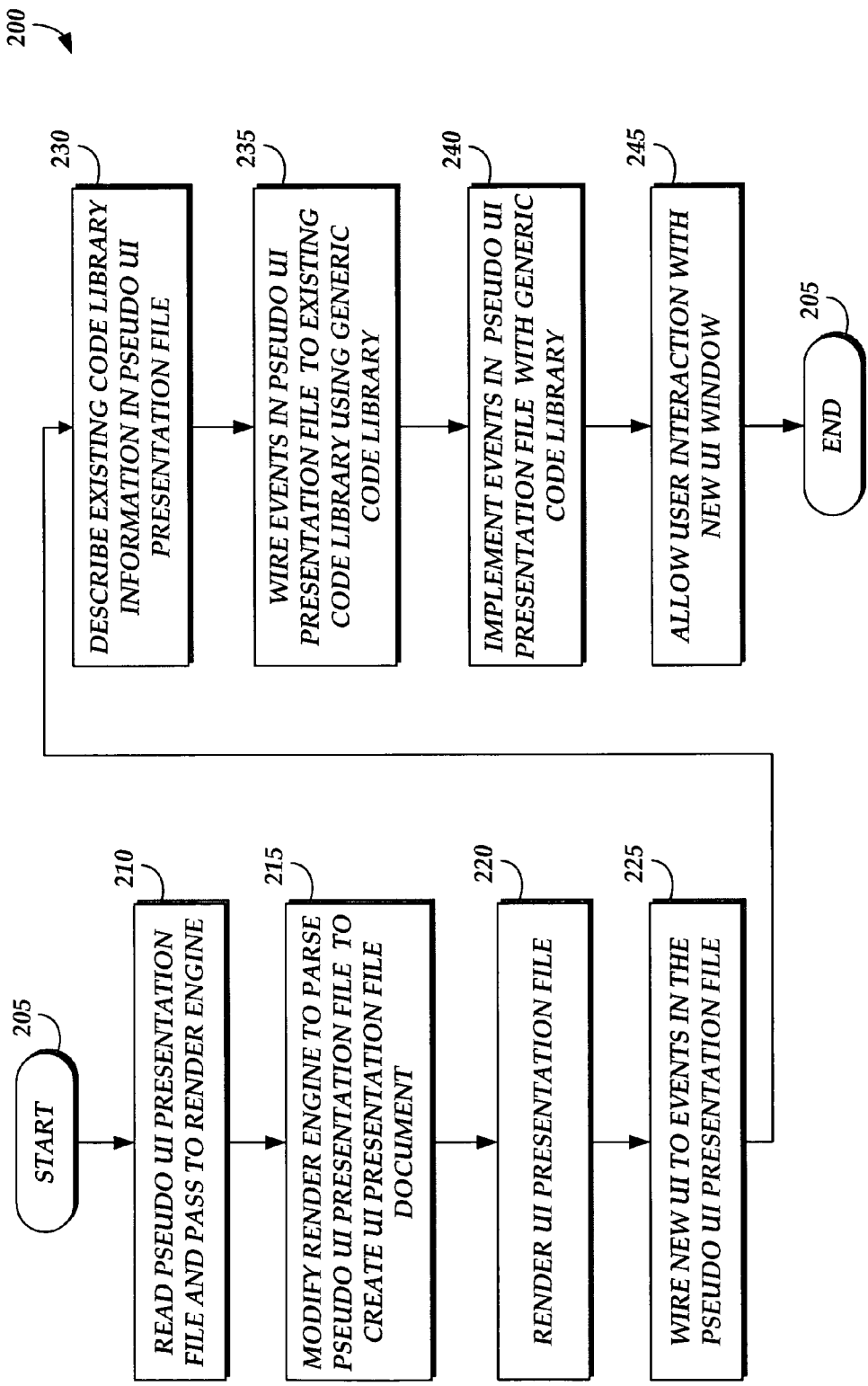
FIG. 2 is a logical flow diagram illustrating a method for dynamically mating modified user interface components with a pre-modified user interface code library.

FIG. 2 is a logical flow diagram illustrating a method for dynamically mating modified user interface components with an existing user interface code library. For purposes of example, consider the flow diagram illustrated in FIG. 2 in terms of a new user interface being generated by a software developer in which a button for executing a print function is being modified in a new user interface 140. The flow diagram illustrated in FIG. 2 will be described with reference to the system architecture illustrated and described above.

Referring then to FIG. 2, the method 200 begins at start operation 205 and proceeds to operation 210 where an example software application, for example, a word processing application, is launched requiring the display of a new or modified user interface 140 designed by a software developer for the word processing application. As should be understood, embodiments of the present invention are equally applicable to any software application utilizing user interfaces for allowing user interaction with underlying software application functionality. Referring still to operation 210, at runtime of the launched software application, the pseudo user interface presentation data (e.g., pXAML file 110) is read and is passed to the render engine 120, as described above. At operation 215, the render engine 120 is modified with the render engine extension 125 for parsing the pseudo user interface presentation data 110 and for generating an associated machine-readable user interface presentation file 130 (e.g., XAML file 130).

Referring still to operation 215, the render engine 120 via the render engine extension 125 generates a table that maps events associated with the new user interface components with event handlers in the existing code library 150 for later use by the generic code library 145 in forwarding events received from new user interface components to existing code event handlers. For example, in a new or modified print button in an example word processing operation, an event for the new print button may be identified as "click on print button," but the event handler in the existing code library 150 may expect an event identified as "print button click." At operation 215, a table is generated by the render engine extension parser to map the newly identified event to the pre-existing event handler so that the generic code library 150 may forward events associated with the new print button to the appropriate event handler in the existing code library 150.

After the pseudo user interface presentation file is parsed and the mapping table is generated, a machine-readable user interface presentation file 130, for example, a XAML file, is generated by the render engine, and at operation 220, the new user interface 140 is rendered for display. At operation 225, components of the new user interface are wired to events described in the pseudo user interface presentation file. For example, as described above, if a new or modified print button is added to the new user interface 140, the new print button in the new user interface 140 will be functionally associated with its related event described in the pseudo user interface presentation file, for example, "click on print button" event.

At operation 235, the generic code library 145 obtains a metadata for the existing code library from the pseudo user interface presentation file 110 to allow the generic code library 145 to properly map events contained in the new user interface 140 to associated event handlers in the existing code library 150. According to one embodiment, the metadata is in the form of a pXAML file that will describe events in the library and the location of the library, that is, the physical or relative path to the library. At operation 235, the generic code library 145 wires or functionally associates the events for components of the new user interface 140 to related event handlers contained in the existing code library 150.

At operation 245, user interaction with the new user interface 140 is allowed, and the generic code library 145 ensures that events received via the new user interface 140 are forwarded to appropriate event handlers in the existing code library 150. For example, at operation 245, if a user selects a new print button in the new user interface 140 triggering an event identified as "click on print button," the generic code library 145 will forward the received event to an appropriate event handler in the existing code library 150, for example, an event handler identified as "print button click," and the associated functionality will be executed.

Exemplary Operating Environment

Figure 3:
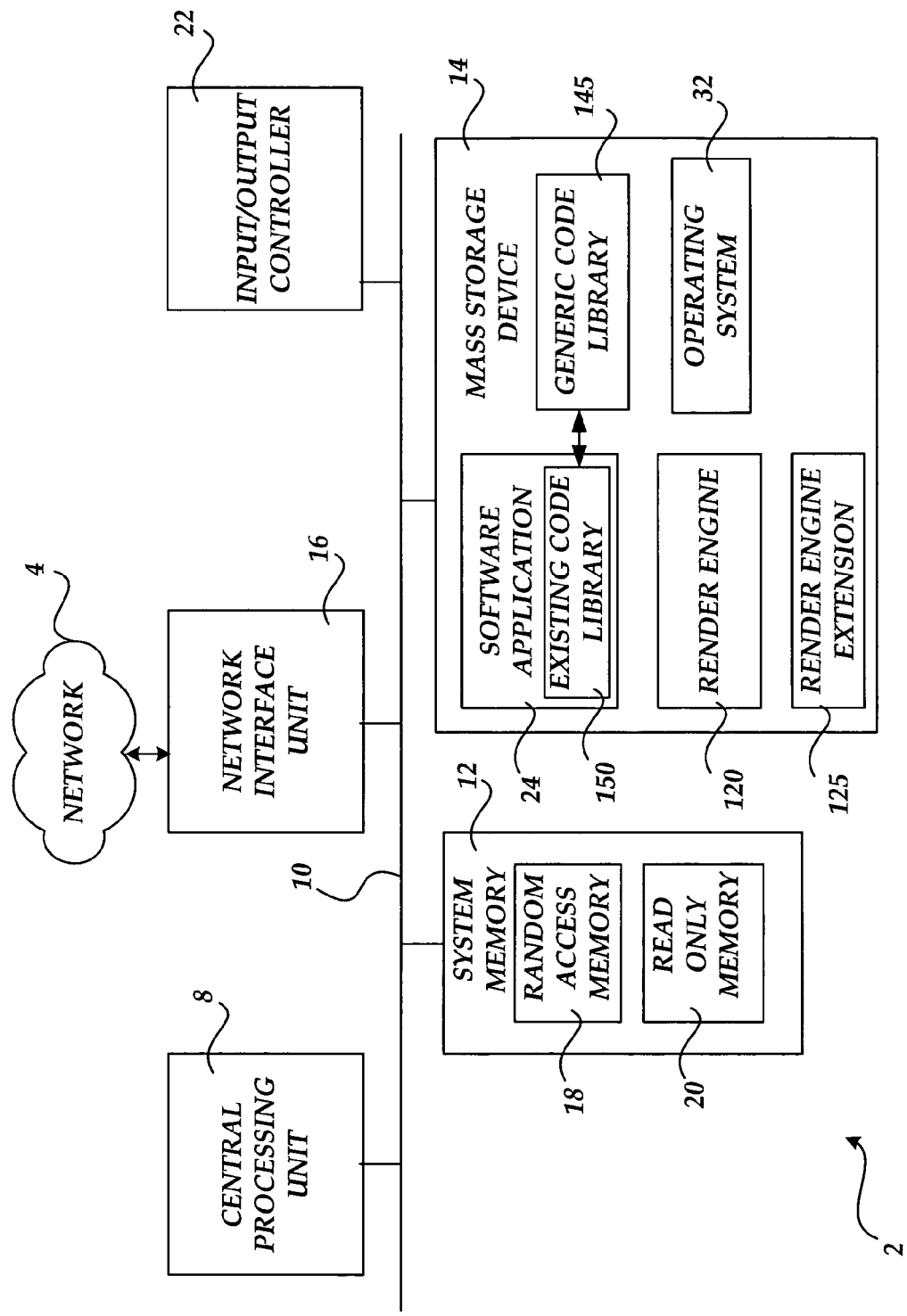
FIG. 3 illustrates an exemplary computing operating environment in which embodiments of the present invention may be practiced.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS® operating systems from MICROSOFT CORPORATION of Redmond, Wash. The mass storage device 14 and RAM 18 may also store one or more program modules. In particular, the mass storage device 14 and the RAM 18 may store application programs, such as a software application 24, as well as the render engine 120, render engine extension 125, generic code assemble 145 and existing code library 150, described above.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method of generating a mapping between modified components of a software application user interface and an existing software code library, comprising:
    receiving a pseudo user interface presentation file for describing modifications to components of the user interface and for describing events associated with the components of the user interface;
    at runtime of a software application, passing the pseudo user interface presentation file to a user interface render engine for generating a user interface presentation file for rendering a modified user interface in a displayed form as modified by the modifications to components of the user interface;
    at the render engine, parsing the pseudo user interface presentation file and obtaining the modifications to the components of the modified user interface;
    at the render engine, generating a table that maps events associated with the modified user interface with one or more event handlers associated with the existing software code library;
    rendering the modified user interface according to the user interface presentation file;
    generating a generic software code library for allowing interaction between the modified user interface and the existing software code library via the generated mapping, wherein upon receiving an event associated with the modified user interface that is identified as an action associated with a user interface button which is different than a user interface button action expected by the one or more event handlers, the received event is mapped to an associated one of the one or more event handlers in the existing software code library; and
    processing events received via the modified user interface at the existing software code library via the generic software code library.

2. The method of claim 1, wherein receiving a pseudo user interface presentation file includes receiving a pseudo user interface presentation file for describing the existing software code library associated with the user interface.

3. The method of claim 1, wherein receiving a pseudo user interface presentation file includes receiving the pseudo user interface presentation file as a pseudo Extensible Application Markup Language file.

4. The method of claim 3, wherein passing the pseudo user interface presentation file to a user interface render engine includes passing the pseudo user interface presentation file as an Extensible Markup Language file to the user interface render engine.

5. The method of claim 1, wherein processing events received via the modified user interface at the existing software code library via the generic code library includes:
    receiving an event via the modified user interface;
    passing the event to the generic software code library;
    at the generic software code library, parsing the table of events to determine an event handler in the existing software code library that corresponds to the received event; and
    at the generic software code library, passing the received event to the event handler in the existing software code library that corresponds to the received event for execution of an associated functionality of the software application.

6. The method of claim 1, wherein generating a table that maps events associated with the modified user interface with one or more event handlers associated with the existing software code library comprises generating the table without manually modifying the existing code library for each modification made in the modified user interface.

7. A computer readable medium containing computer executable instructions which when executed by a computer perform a method of generating a mapping between modified components of a software application user interface and an existing software code library, the method comprising:
    at the software application, receiving a pseudo Extensible Application Markup Language (pXAML) user interface presentation file for describing modifications to components of the user interface and for describing events associated with components of the user interface;
    at software application runtime, passing the pXAML presentation file to a user interface render engine for generating an Extensible Application Markup Language (XAML) user interface presentation file for rendering a modified user interface in a displayed form as modified by the modifications to components of the user interface;
    at the render engine, parsing the pXAML presentation file and obtaining the modifications to the components of the modified user interface;
    at the render engine, generating a table that maps events associated with the modified user interface with one or more event handlers associated with the existing software code library;
    rendering the modified user interface according to the user interface presentation file;
    generating a generic software code library for allowing interaction between the modified user interface and the existing software code library via the generated mapping, wherein upon receiving an event associated with the modified user interface that is identified as an action associated with a user interface button which is different than a user interface button action expected by the one or more event handlers, the received event is mapped to an associated one of the one or more event handlers in the existing software code library; and processing events received via the modified user interface at the existing software code library via the generic software code library.

8. The computer readable medium of claim 7, wherein passing the pXAML presentation file to a user interface render engine includes passing the pXAML presentation file as an Extensible Markup Language file.

9. The computer readable medium of claim 7, wherein processing events received via the modified user interface at the existing software code library via the generic code library includes:

receiving an event via the modified user interface;

passing the event to the generic software code library;

at the generic software code library, parsing the table of events to determine an event handler in the existing software code library that corresponds to the received event; and at the generic software code library, passing the received event to the event handler in the existing software code library that corresponds to the received event for execution of an associated functionality of the software application.

10. A computer system for generating a mapping between modified components of a software application user interface and an existing software code library, comprising:

a memory for storing executable program code; and a processor, functionally coupled to the memory, the processor being responsive to computer-executable instructions contained in the program code and operative to:

receive a pseudo user interface presentation file for describing modifications to components of the user interface and for describing events associated with components of the user interface;

parse the pseudo user interface presentation file to obtain the modifications to the components of the user interface;

generate a table that maps events associated with the modified user interface with one or more event handlers associated with the existing software code library;

render a modified user interface in a displayed form as modified by the modifications to the components of the user interface;

receive events via the modified user interface; and generate a generic software code library for allowing interaction between the modified user interface and the existing software code library via the generated mapping, wherein upon receiving an event associated with the modified user interface that is identified as an action associated with a user interface button which is different than a user interface button action expected by the one or more event handlers, the received event is mapped to an associated one of the one or more event handlers in the existing software code library.

11. The system of claim 10, wherein the processor is further operative to:

receive an event via the modified user interface;

parse the table to determine an event handler in the existing software code library that corresponds to the received event; and pass the received event to the event handler in the existing software code library that corresponds to the received event for execution of an associated functionality of the software application.

12. The system of claim 11, wherein the processor is further operative to:

receive the pseudo user interface presentation file at application runtime; and generate a user interface presentation file according to a desired format prescribed by a render engine extension.

13. The system of claim 11, wherein the processor is further operative to:

parse the pseudo user interface presentation file to determine one or more of the events associated with the components of the modified user interface; and determine the one or more event handlers of the existing software code library corresponding to the one or more of the events associated with the components of the modified user interface.

14. The system of claim 10, wherein the user interface button action identifies a printing action for a word processing operation in the modified user interface.

* * * * *